United States Patent [19]
Gøthesen

[11] Patent Number: 5,845,676
[45] Date of Patent: Dec. 8, 1998

[54] BALLAST TANK DEVICE

[76] Inventor: Ola Gøthesen, Peter Blegers vei 9, N-1370, Asker, Norway

[21] Appl. No.: 581,964

[22] Filed: Jan. 2, 1996

[30] Foreign Application Priority Data

Jan. 12, 1995 [NO] Norway .................................. 950116

[51] Int. Cl.$^6$ ...................................................... F17D 3/01
[52] U.S. Cl. ......................................... 137/590; 137/140
[58] Field of Search .................................. 137/140, 142, 137/143, 151, 577, 578, 590

[56] References Cited

U.S. PATENT DOCUMENTS

| | | | |
|---|---|---|---|
| 1,472,560 | 10/1923 | Griffiths et al. | 137/143 X |
| 1,536,437 | 5/1925 | Klein | 137/140 |
| 1,788,280 | 1/1931 | Dempsey | 137/590 X |
| 1,921,021 | 1/1933 | Tuller | 137/140 |
| 2,601,894 | 7/1952 | Morse | 137/590 X |
| 2,629,334 | 2/1953 | Swanson | 137/577 X |
| 2,638,222 | 5/1953 | Roach | 137/577 |
| 2,851,193 | 9/1958 | Hobson | 137/143 X |
| 2,934,087 | 4/1960 | Crow | 137/590 |
| 4,219,047 | 8/1980 | Polley | 137/590 |
| 4,255,361 | 3/1981 | Goettl | 137/143 X |

Primary Examiner—John Rivell
Attorney, Agent, or Firm—Nixon & Vanderhye

[57] ABSTRACT

A ring float floating in the surface of the ballast liquid is arranged around a pump housing with suction port submerged in a ballast tank. The ring float runs around the pump housing and will form a barrier which prevents a contaminating layer on the liquid surface from being drawn in through the suction port, said barrier preventing the contaminating layer from reaching the port before the suction port loses its suction effect as result of it taking in air.

9 Claims, 6 Drawing Sheets

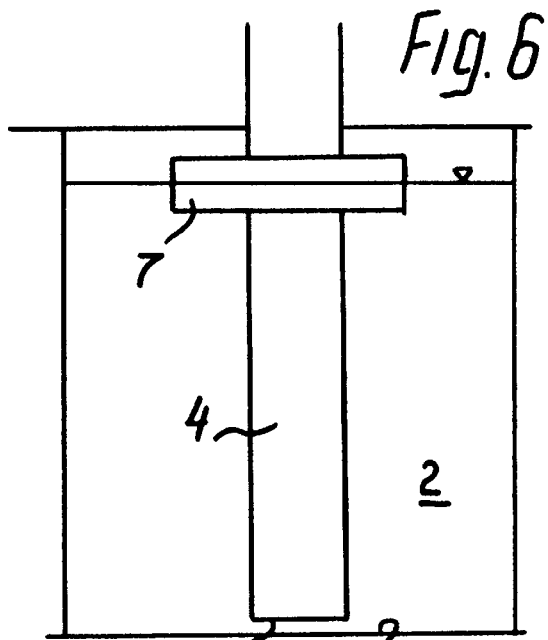
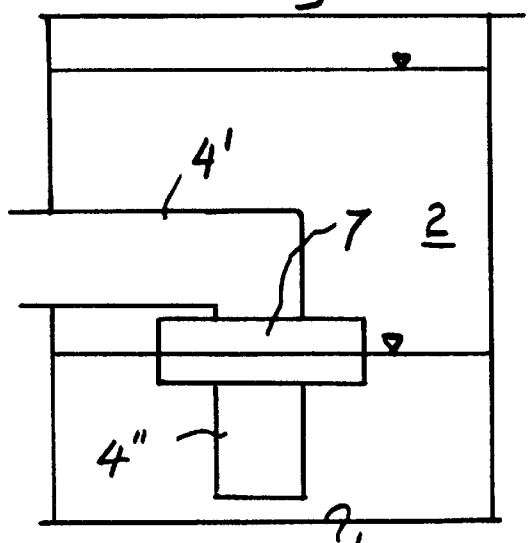
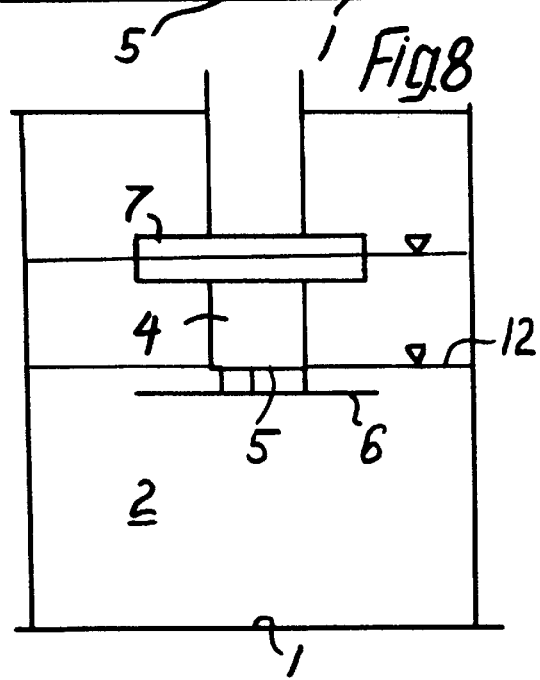
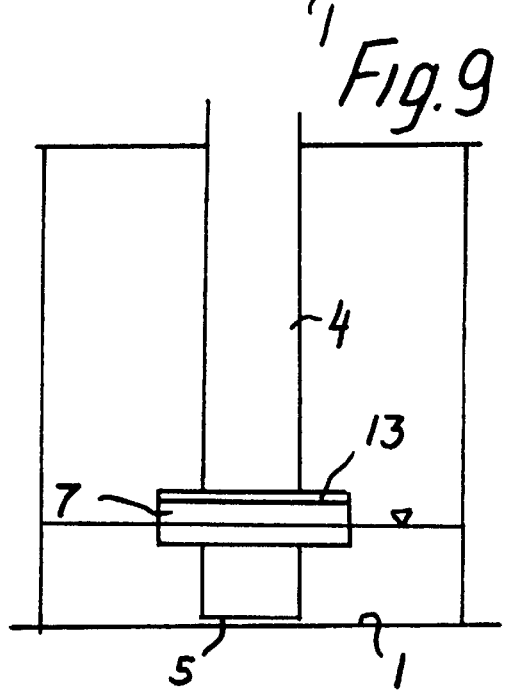

BALLAST TANK DEVICE

The invention relates to a ballast tank device comprising a tank for receiving liquid and having a liquid discharge aperture opening into the tank.

The invention has been developed in connection with a problem encountered with ballast tanks, but can, of course, also be used in other tanks where there are similar problems with a contaminating layer.

Ballast tanks on board ships are particularly subject to corrosion as the liquid level in the ballast tanks often changes and the steel surfaces in the tanks therefore alternate between an exposed and a liquid-covered state. The use of an anti-corrosive liquid which is in the ballast liquid, usually water, to protect ballast tanks against corrosion is known. This anti-corrosive liquid will accompany the water level as a layer in the liquid surface and settles like a protective layer on the surrounding tank walls.

When deballasting, by the pumping out or release of the ballast water, the problem arises that the anti-corrosive liquid layer, which in environmental terms constitutes a contaminating layer, must not be permitted to pass out into the surrounding environment.

One of the objectives of the invention is to provide a simple and reliable device which without monitoring the liquid levels, amounts of pollutants and so forth, prevents the contaminating layer in the liquid surface from being pumped out.

This is achieved according to the invention in that measures are taken to ensure that a barrier is established which acts against the liquid surface, ie, the layer or coating thereon, at least during the final discharge phase.

According to the invention, a ballast tank device is therefore proposed comprising a tank for receiving liquid and having a discharge aperture opening out in the tank, characterised by means for automatically establishing a barrier against an anticipated/estimated contaminating layer in the liquid surface around the discharge aperture.

According to the invention, one embodiment of this device is realisable in practice in that floating in the liquid in the tank a float is provided which forms a barrier in the liquid surface, at a height at least equal to the contaminated layer in the liquid surface, and in that guiding means are provided in the tank, which guide the float to rest around the discharge aperture, in a position where the float will form a barrier around the discharge aperture.

The invention can be used for all possible discharge apertures, also for those which open out in a vertical or slanting wall.

In the case of a discharge aperture which opens out vertically, the invention can be implemented advantageously in that the float forms a ring barrier in the liquid surface, sufficiently large to surround the discharge aperture. A float of this kind thus forms a frame, the ring or frame form of which may or may not be adapted to the shape of the discharge aperture. "Ring" here thus does not necessarily mean a circle, but may, for instance, also mean a square, a rectangle or other configurations.

If the discharge aperture is a bottom aperture, there may to advantage be a ring edge around the apertule, as extra security against the outflow of pollution in the liquid surface.

Above the draw-off level, there may to advantage be provided in the tank a stop for the float, as the float is not required to be in the liquid surface except when it approaches the discharge aperture.

The guiding means may be realised in many ways. For instance, they may include guide lines which guide the float.

An extension of the discharge pipe may, for example, extend from a bottom aperture, the ring float extending therearound.

Often a ballast tank is equipped with a submerged pump housing or pump pipe having a suction port. In such cases, the invention may be implemented in that around the pump housing or pump pipe a ring-shaped float is provided floating in the surface of the liquid, and that below the suction port a stop is provided for the float. The float must have a vertical dimension below the surface of the liquid corresponding to the space between the suction port and underlying stop and is designed as a ring barrier in the surface of the liquid in its floating state, the height of the submerged part corresponding to at least the contaminated layer in the surface of the liquid.

A float of this kind will accompany the level of the liquid the final pumping out phase, and when it approaches the stop it will settle like a ring barrier around the pump housing or pump pipe and prevent the contaminated layer from being drawn into the suction port, in that the pump will draw air and lose its pumping effect before the contaminated layer is exposed to the drawing effect of the pump. In the ring area which is limited by the float around the pump housing or pump pipe a possible polluting layer will be drawn in by the pump, but in this case the proportion of pollution is insignificant.

Usually the said stop will be formed by a bottom in the tank. In some cases the suction port will be a considerable distance above the lower bottom portion of the tank, eg, when it is a matter of a pump in an afterpeak on board a ship where it is not desirable to be able to empty the tank, since on account of the propeller it is desirable to maintain water for cooling the propeller shaft casing. In such cases, according to the invention, said stop for the float may be formed by a stop fixed at a distance below the suction port. This stop may preferably be in the form of a disc-shaped body.

The float does not need to "swim", ie, float in the liquid surface in the whole vertical extent of the tank. The essential is that the barrier action of the float comes into effect when the float floats in the surface of the liquid and the surface of the liquid or liquid level approaches the suction port.

The invention will now be described in more detail with reference to the drawings, wherein:

FIG. 6 shows in a purely schematic manner a ballast tank device according to the invention;

FIG. 7 shows another possible embodiment of a ballast tank device according to the invention;

FIG. 8 illustrates yet another possible embodiment of a ballast tank device according to the invention; and FIGS. 9–11 show additional schematic exemplary embodiments.

Figure 1:
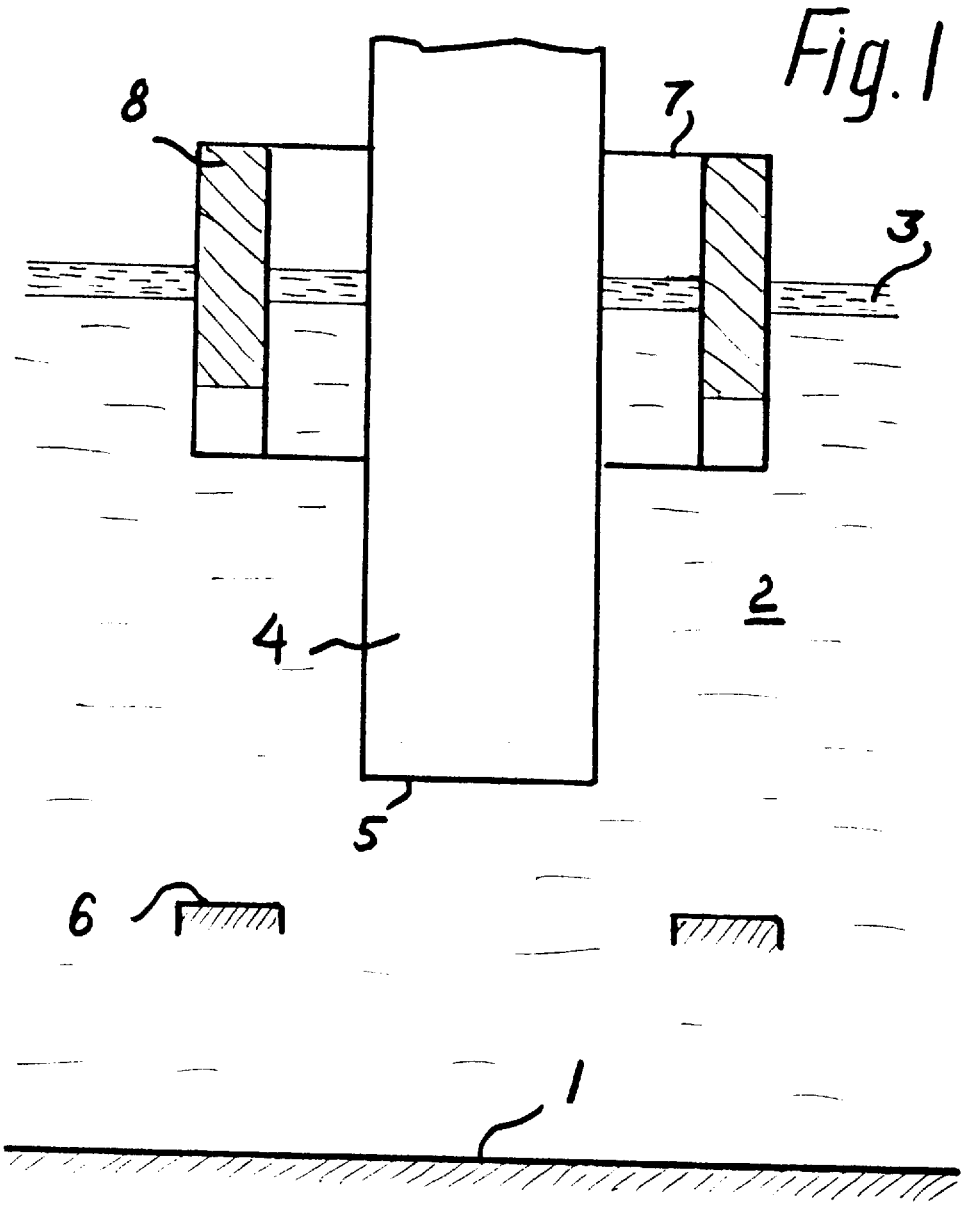
FIGS. 1 and 2 show in a purely schematic form the invention and the principle thereof.
Figure 2:
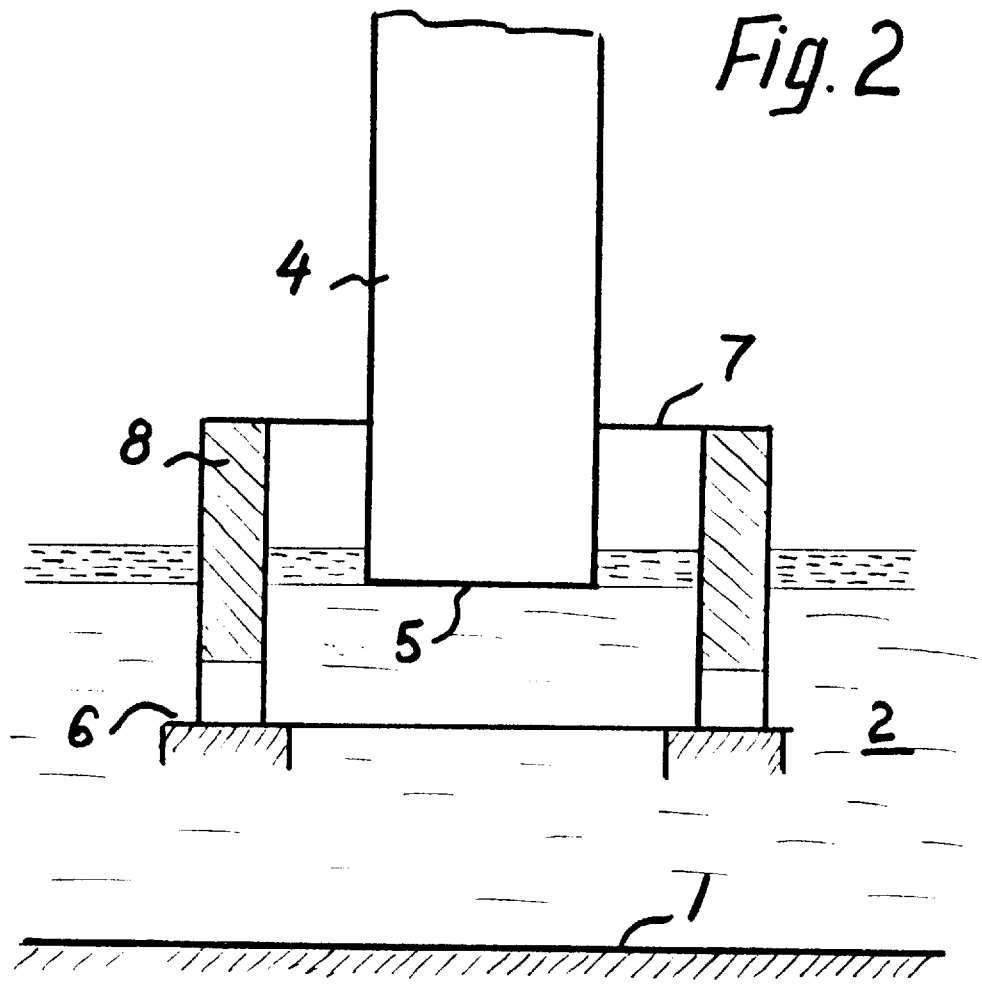

The principal idea of the invention will first be explained with reference to FIGS. 1 and 2. In FIG. 1 a tank bottom is indicated by means of the reference numeral 1. A water mass in the tank is designated 2. An anti-corrosive coating 3 floats in this water mass.

A pump housing 4 projects down into the water mass 2 and has a lower suction port 5. At a distance above the bottom 1 of the tank a stop 6 is provided which is designed for stopping interaction with a float ring 7 floating in the liquid surface. This float ring extends around the pump housing 4 and forms a liquid-tight barrier 8 around the pump housing 4, at any event in a height which at least corresponds to the thickness of the contaminating layer 3. In FIGS. 1 and 2, the height of the thus formed ring barrier is indicated by means of shading. The ring barrier can, of course, extend over the entire height of the float 8.

When the ballast water 2 is pumped out through the suction port 5, the liquid level, here symbolised by the contaminating layer 3, will fall and the float 7 will accompany it downwards. Finally, the float 7 will come to rest against the stop 6, as shown in FIG. 2. With appropriate dimensioning of the height of the float 7, this will happen in the instant the contaminating layer or liquid surface is on a level with the suction port, as shown in FIG. 2. On continued pumping out, the liquid level will fall even further, until the pump port 5 takes in air. This happens without the contaminating layer 3 being drawn into the pump port 5. The portion of the contaminating layer, which is in the annular space between the ring float 7 and the pump housing 4, will be drawn into the final pumping phase, but this, as will be understood, involves an insignificant amount of pollution.

The ballast tank device described thus far requires measures to be taken to prevent too much ballast water from being pumped out, it being desirable that a certain amount of ballast water should remain in the tank, eg, in an afterpeak as mentioned above, and therefore stops 6 are provided at a distance below the suction port 5. These stops 6 stop the float 7 as shown in FIG. 2. The tank bottom 1 can, of course, be used as a stop. An embodiment of this kind is illustrated in a purely schematic manner in FIG. 6.

Figure 3:
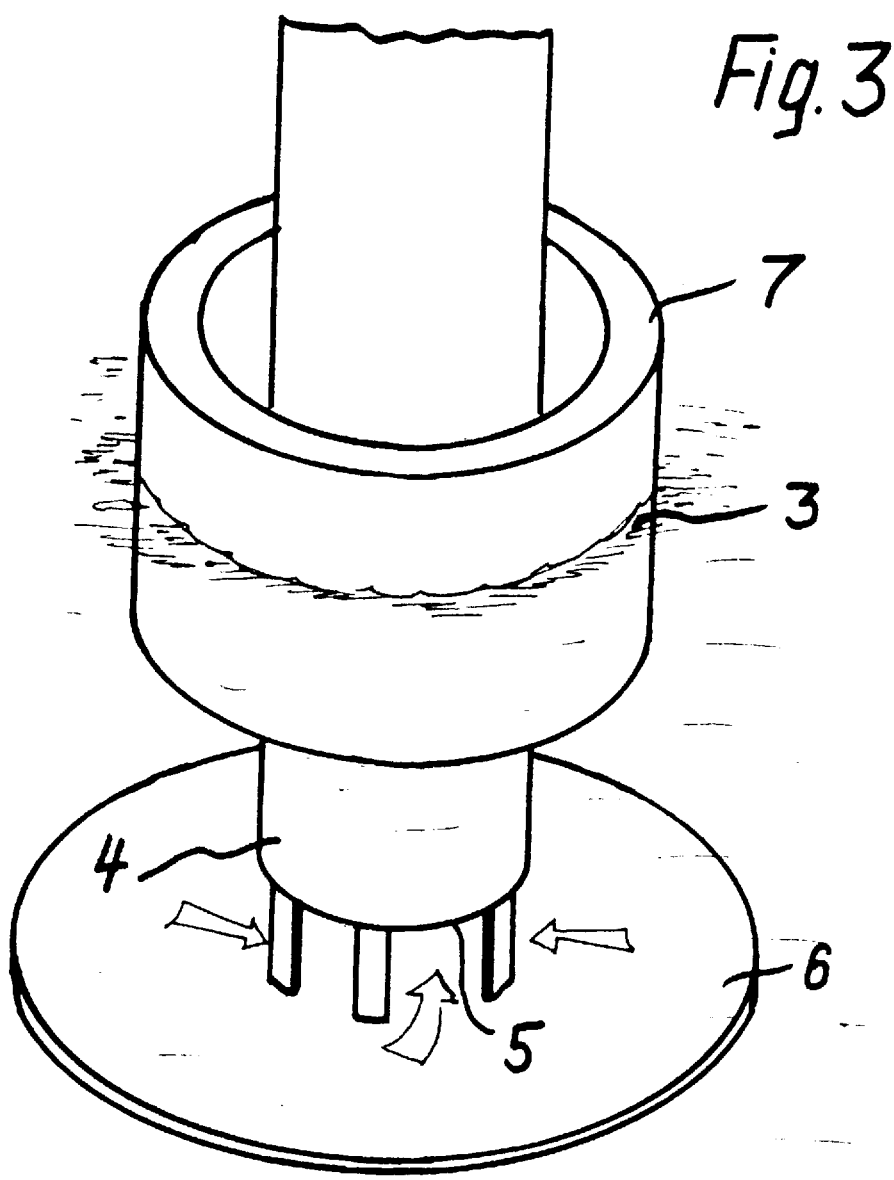
FIG. 3 is a perspective view of a possible embodiment according to the invention.
Figure 4:
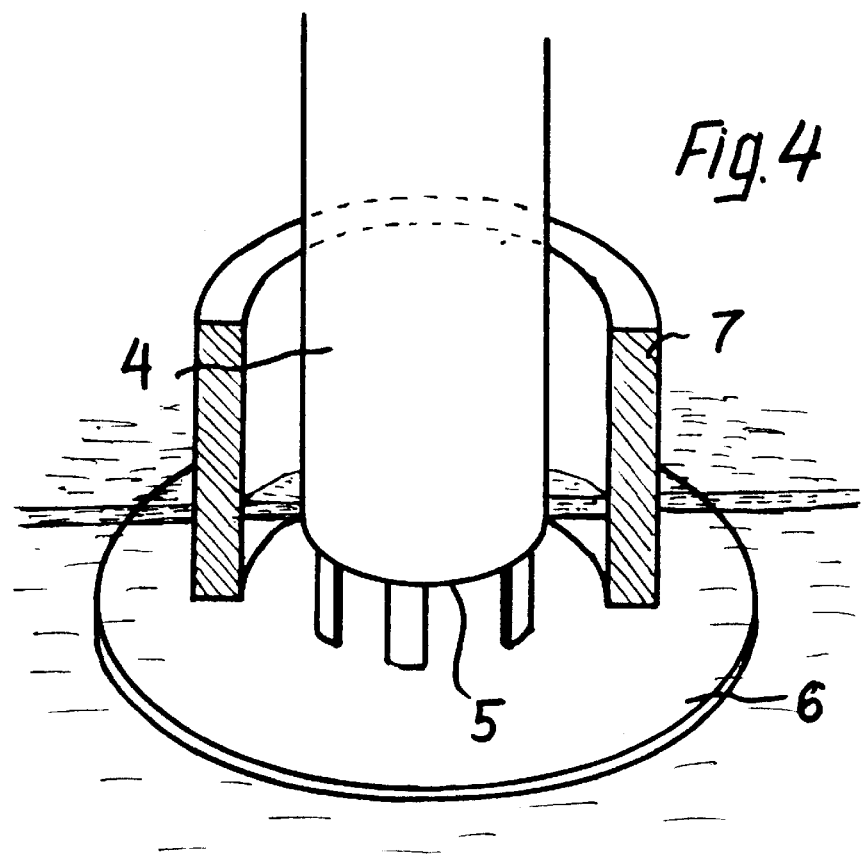
FIG. 4 illustrates the embodiment in FIG. 3 in the beginning of the action phase.

In FIGS. 3 and 4, a perspective view of a possible embodiment according to the invention is shown. The pump housing 4 with its suction port 5 is found again in FIGS. 3 and 4. A float 7 floats around the pump housing 4.

Below the suction port 5 a stop 6 is provided, here in the form of a disc-shaped body supported by stays 9. As the liquid level 3 falls, the float will come to rest against the disc 6, as shown in FIG. 4, where the float 7 has been cut away. When the pumping out continues the pump will draw air. This will happen before the contaminating layer 3 can be affected by the pump suction.

Figure 5:
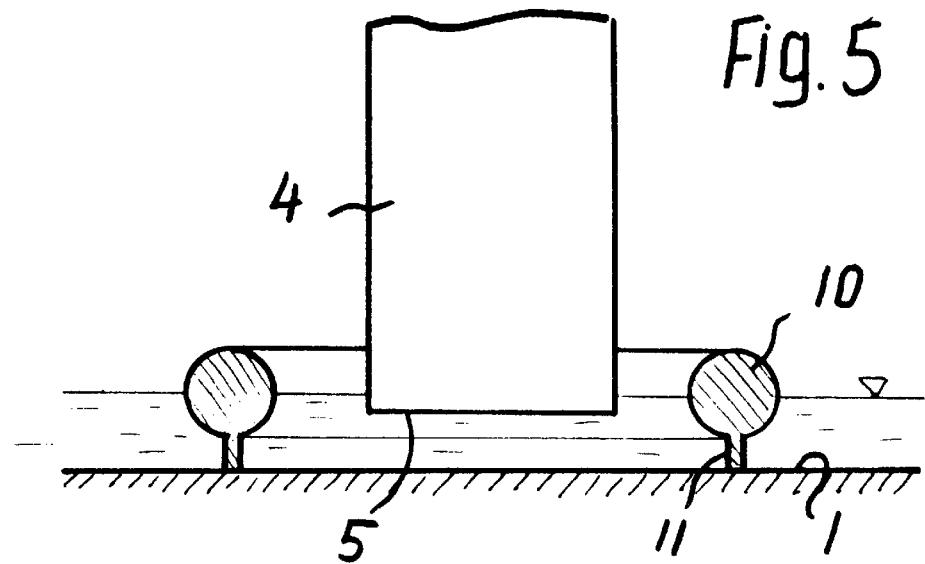
FIG. 5 shows a possible embodiment, in a purely schematic form, with a cutaway float.

The ring float may, of course, have many different designs, as that which is essential is that it should form a ring barrier when it comes to rest against an underlying stop. Another possible float embodiment is thus shown in a purely schematic manner in FIG. 5 where the pump housing 4 with suction port 5 and tank bottom 1 are found again. Here, the float 10 has an annular body, roughly circular in crosssection, with a downward projecting skirt 11, which comes to rest against the tank bottom 1, whereby a barrier is formed which prevents the contaminating layer from being drawn into the pump port 5 before the pump loses its suction effect as a consequence of the penetration of air.

A common embodiment of a ballast tank device may look in principle as shown in FIG. 6 where there is a quantity of water 2 in a ballast tank having a tank bottom 1. A pump housing 4 projects down into the tank and ends with its mouth 5 at a desired short distance, eg, 5 cm, above the tank bottom 1. A float 7 floats around the pump housing 4. Said float follows the falling liquid level during the pumping out and will come to rest like a barrier around the suction port 5, as has been explained above in connection with FIGS. 1 to 5.

It is not a condition per se that the float should constantly float in the liquid surface. It is only important that it floats in the liquid surface during a final pumping phase, so that it can then form a barrier. Thus, in FIG. 7 a possible embodiment is illustrated where the pump housing 4' has a horizontal section and a vertical section 4", where the float is. The float 7 will thus first float in the surface of the liquid when the liquid level has fallen as shown.

In FIG. 8, an embodiment is shown which corresponds to the embodiment in FIGS. 3 and 4, that is with a stop 6 secured by the pump housing 4 below the suction port 5. The liquid level in the tank in FIG. 8 will not fall below the indicated level 12.

The extent of the ring float 7 in the annular plane is determined on the basis of, inter alia, the anticipated maximum angle of heel during pumping, and the same applies to the dimensioning of the height of the float above the surface of the liquid.

Figure 10:
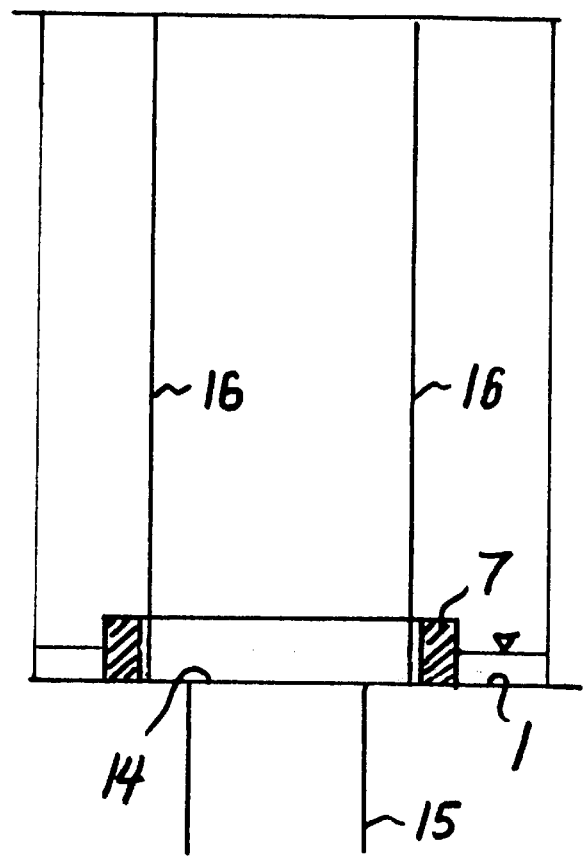
Figure 11:
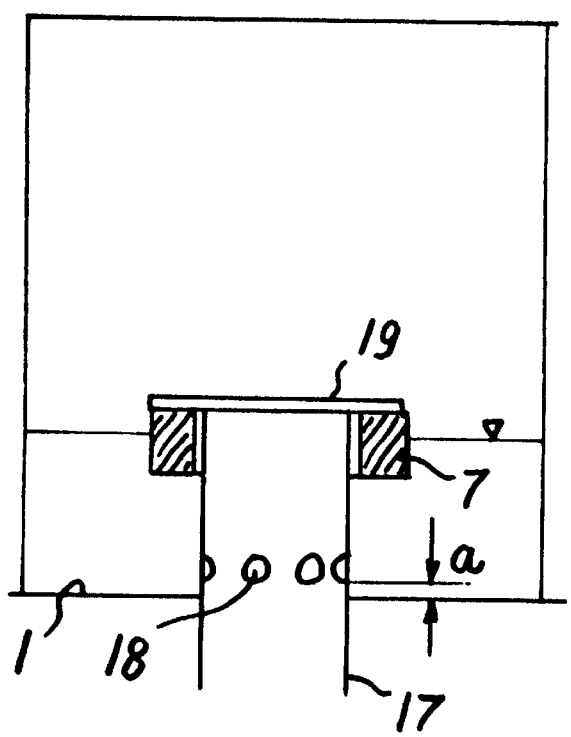

FIGS. 9 to 11 are additional schematic possible embodiments. Thus, in FIG. 9 the pump housing or pipe 4 is equipped with a collar-shaped stop 13 which stops the upward movement of the float 7. In other respects, the device in FIG. 9 functions like the device in FIG. 6.

FIG. 10 shows a tank having a bottom 1 with a draw-off opening 14 in the bottom 1. The draw-off opening forms a device in the tank for a discharge pipeline 15 using the force of gravity. A ring float 7 (shown cut away) is placed in the tank, guided by a number of lines 16, eg, 3 or 4, suspended in the tank. The guiding causes the ring float 7 to sink down to the shown barrier position around the draw-off opening 14.

A tank having a bottom 1 wherein a discharge pipe 17 is positioned is shown in FIG. 11. The discharge pipe 17 projects upward somewhat and into the tank. At the bottom 1 the discharge pipe has wall openings 18 for the outflow of liquid from the tank. At the top, the discharge pipe 17 is provided with a disc 19 which forms a stop for the ring float 7 (shown cut away). When the float 7 falls together with the liquid surface it will form a barrier around the discharge aperture formed by the openings 18. As extra security, the openings are positioned with their lower edges at a distance a above the bottom.

In the case of the embodiments which are based on gravitation discharge, shut-off valves (not shown) are, of course, provided in the discharge pipes. The illustrated examples are not exhaustive or limiting.

Having described my invention, I claim:

1. A ballast tank device comprising a tank for receiving liquid and a liquid discharge aperture opening out in the tank, characterised in that floating in the liquid in the tank a float is provided which forms a barrier in the liquid surface, at a height at least equal to a contaminated layer in the liquid surface, and in that in the tank guiding means are provided which guide the float to rest around the discharge aperture, in a position where the float will form a barrier around the discharge aperture.

2. A ballast tank device as disclosed in claim 1, characterised in that the float is a ring float which will form a ring barrier in the liquid surface.

3. A ballast tank device as disclosed in claim 1, characterised by a stop for the float above a draw-off level of the discharge aperture.

4. A ballast tank device as disclosed in claim 1, characterised in that the guiding means comprise guide lines.

5. A ballast tank device as disclosed in claim 1, characterised in that the guiding means comprise a discharge/suction pipe.

6. A ballast tank device as disclosed in claim 1, characterized in that the float is arranged as a ring around a pump housing and that below the discharge aperature a stop is provided for the float, said float having a vertical dimension below the surface of the liquid equal to the distance of the discharge aperture above said underlying stop.

7. A ballast tank device as disclosed in claim 6, characterised in that said stop is formed by a bottom in the tank.

8. A ballast tank device as disclosed in claim 6, characterised in that said stop is formed by a body secured at a distance below the discharge aperture.

9. A ballast tank device as disclosed in claim 8, characterised in that the stop is formed by a disc-shaped body.

* * * * *